Jan. 16, 1951 A. H. WAKEMAN 2,538,716
ICE-CREAM FREEZER
Filed March 13, 1948 4 Sheets-Sheet 2
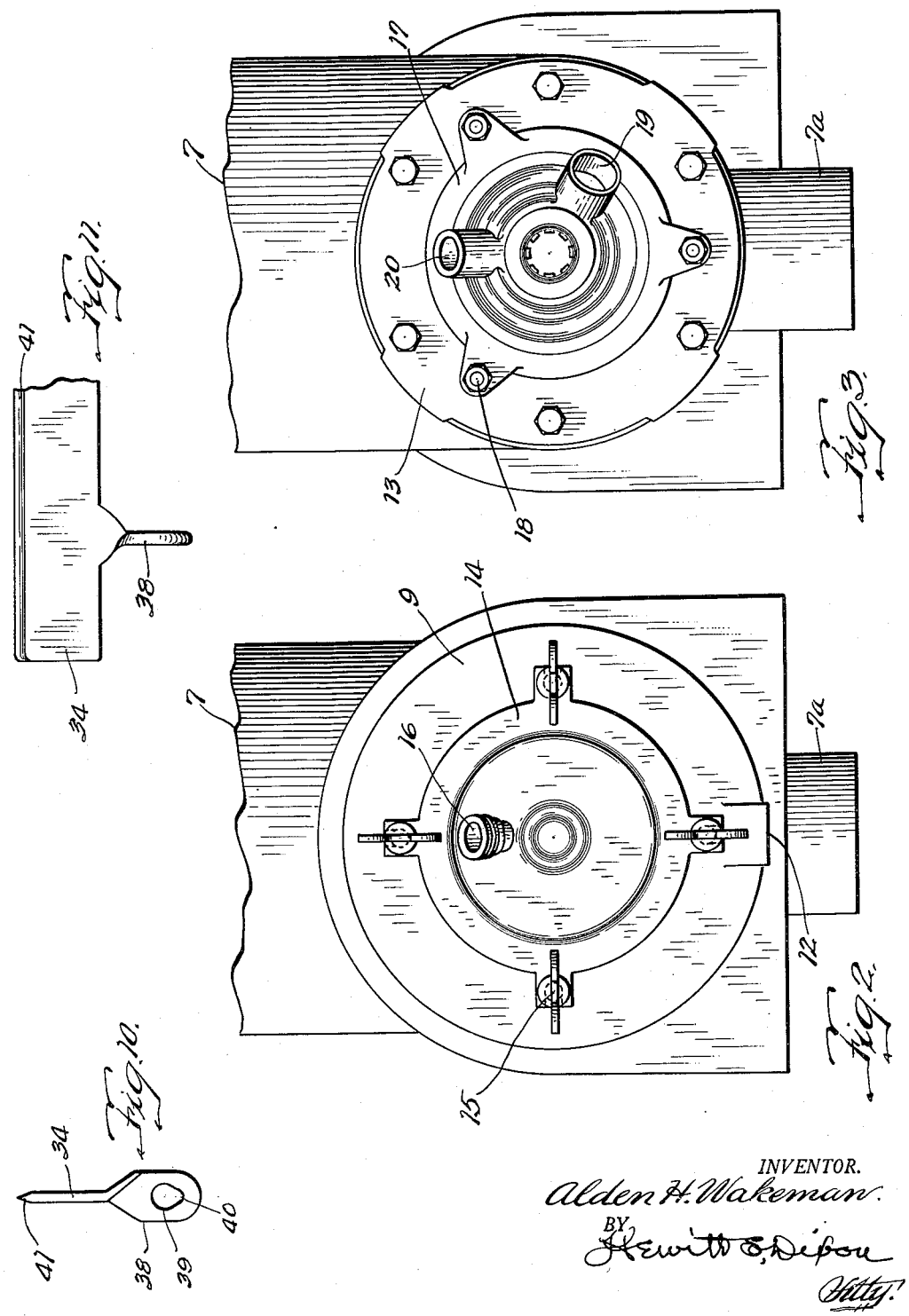
INVENTOR.
Alden H. Wakeman
BY
Hewitt E. Dixon
Atty.

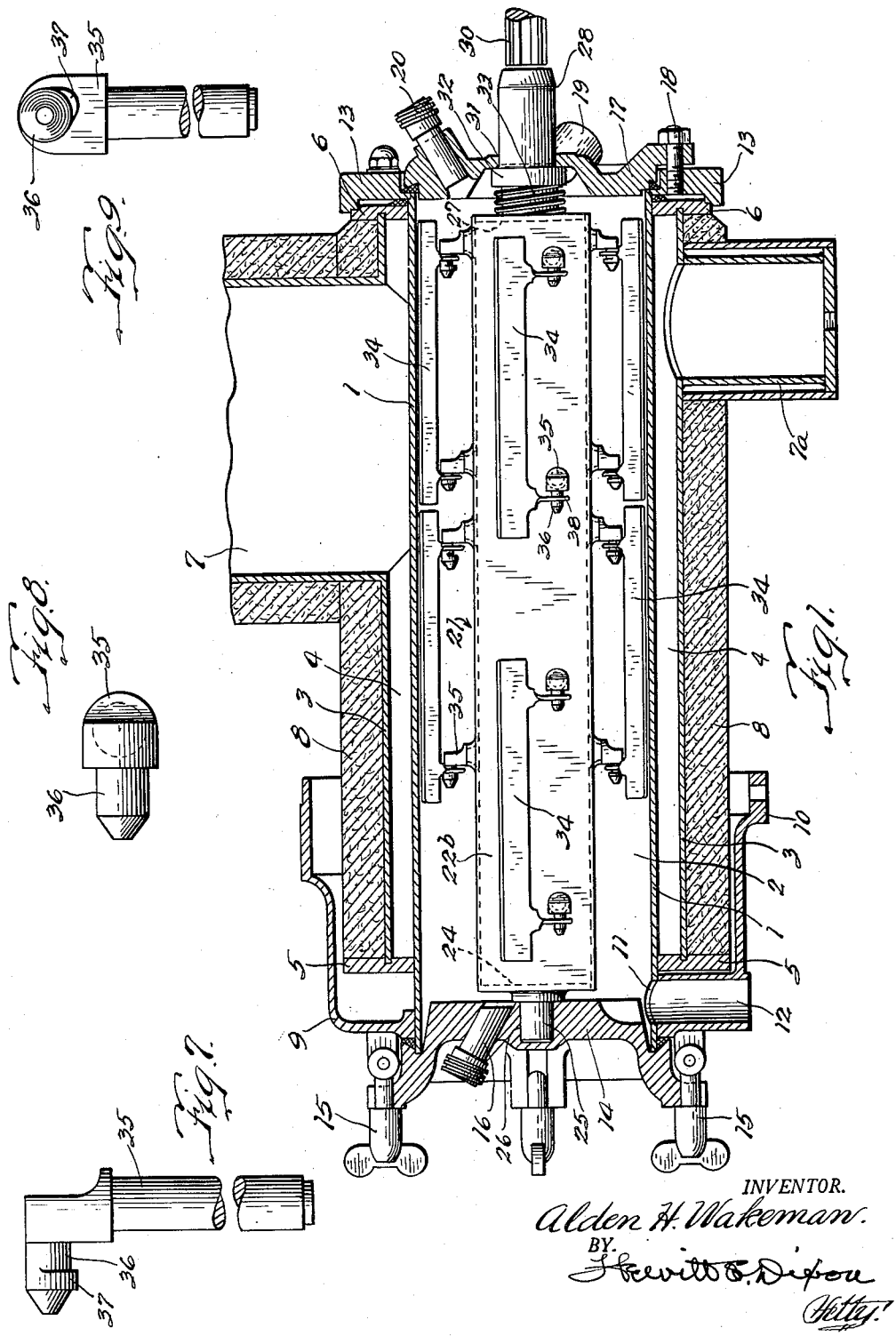

Jan. 16, 1951  A. H. WAKEMAN  2,538,716
ICE-CREAM FREEZER
Filed March 13, 1948 4 Sheets-Sheet 3
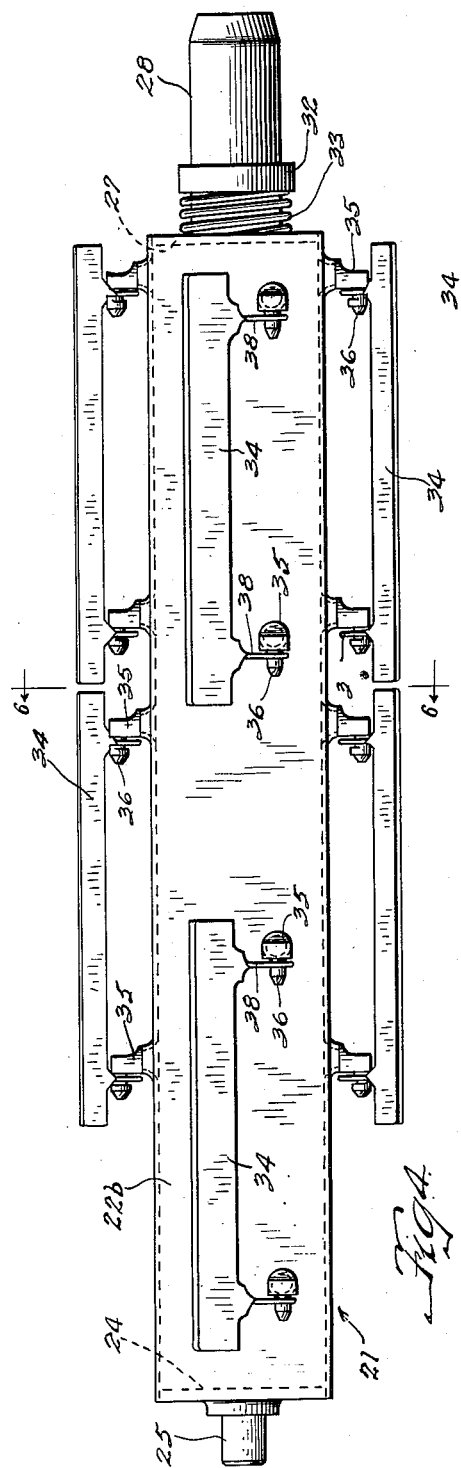
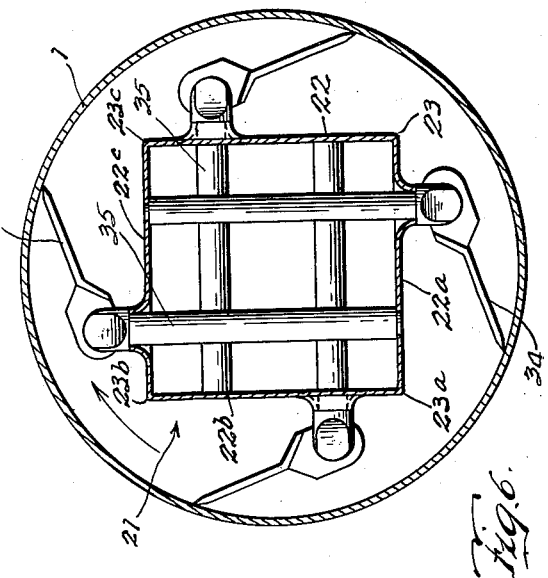
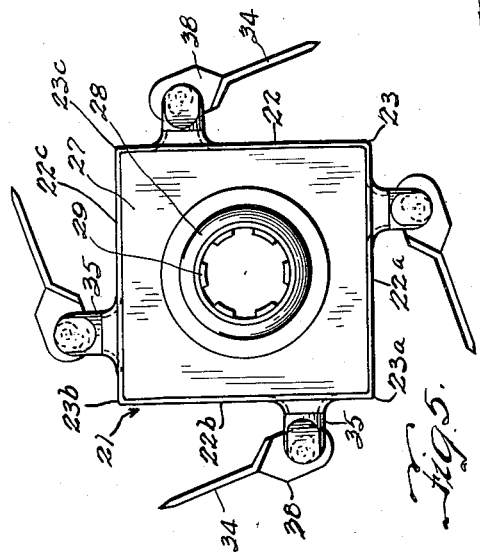
INVENTOR.
Alden H. Wakeman.
BY
Hewitt E. Dixon
Atty.

Jan. 16, 1951     A. H. WAKEMAN     2,538,716
ICE-CREAM FREEZER
Filed March 13, 1948     4 Sheets-Sheet 4
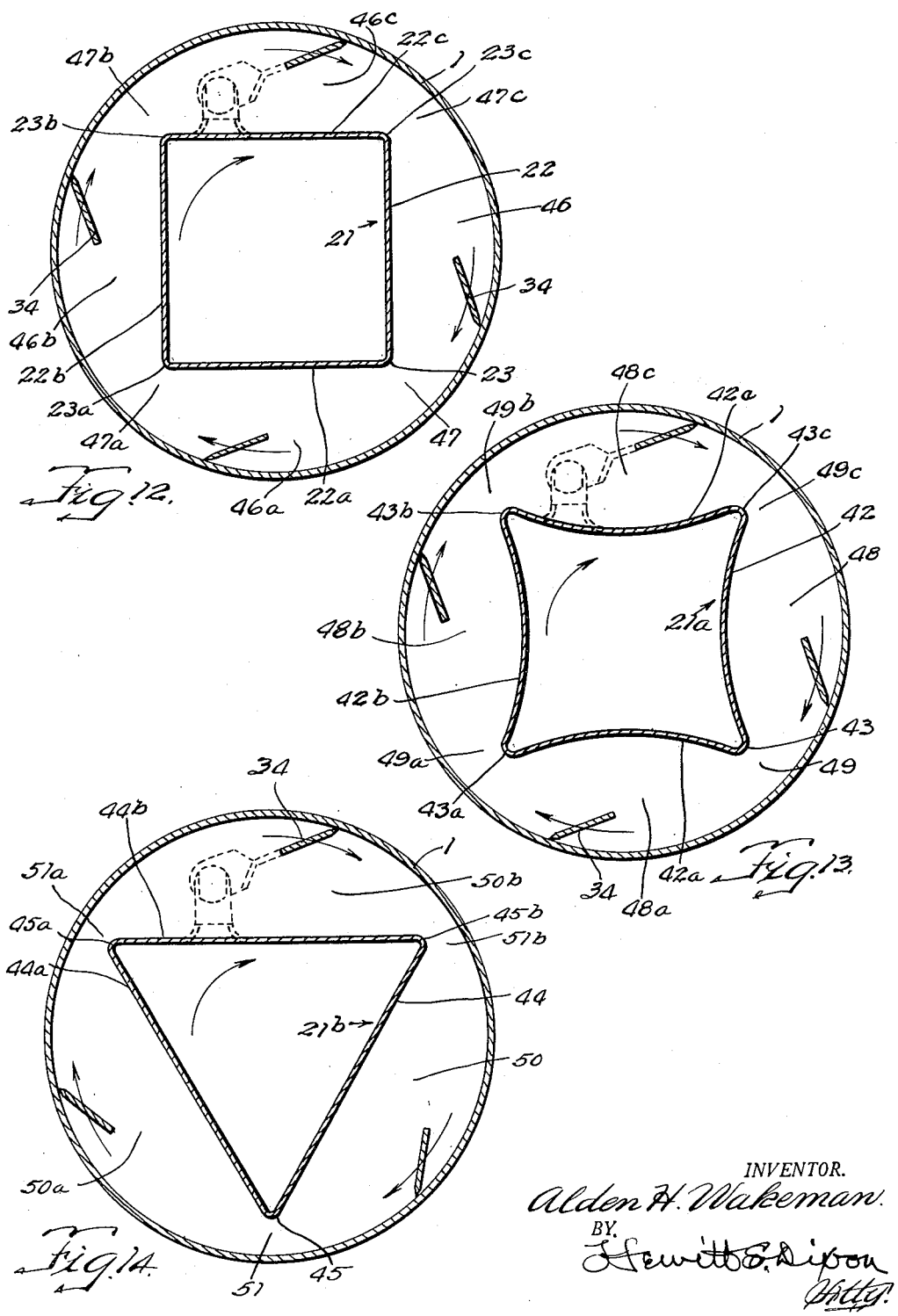
INVENTOR.
Alden H. Wakeman.
BY Hewitt E. Dixon
Atty.

Patented Jan. 16, 1951

2,538,716

UNITED STATES PATENT OFFICE 2,538,716

ICE-CREAM FREEZER

Alden H. Wakeman, Crystal Lake, Ill., assignor to The Creamery Package Mfg. Company, Chicago, Ill., a corporation of Illinois Application March 13, 1948, Serial No. 14,780

1 Claim. (Cl. 62—114)

The invention relates to ice cream freezers, more particularly to the agitating means employed therein and commonly termed the dasher. As disclosed herein, the invention is applied to an ice cream freezer of the continuous type exemplified in U. S. Patent No. 2,210,366, Godfrey et al., issued August 6th, 1940. It is applicable also to other similar apparatus for chilling fluent food products.

The usual construction of an ice cream freezer includes a refrigerated cylindrical container within which is mounted a dasher rotatable about the axis of the cylinder. The dasher commonly comprises agitating elements including blades having scraping contact with the refrigerated cylinder wall.

The operative functions of the dasher are to effect a circulatory movement of the liquid mixture of ice cream ingredients commonly called "mix," within the container to and from the refrigerated cylindrical wall, to accomplish a thorough intermixture and progressively uniform lowering of temperature of the mix, to incorporate a certain proportion of air into the mix, and to whip the congealing mix into a finely divided cellular product having uniformly smooth texture and firm body.

It is the object of this invention to provide an ice-cream freezer with a simplified sanitary dasher which accomplishes the functional purposes mentioned with increased effectiveness and which yields a product of superior quality. Other objects and advantages will be apparent in the following description of a preferred embodiment of the invention illustrated in the accompanying drawings.

Referring to the drawings:

Figure 1 represents a sectional view taken on a vertical plane through the axis of a freezing cylinder of a continuous ice cream freezer embodying the present invention.

Fig. 2 is a front end view in elevation of the freezing cylinder.

Fig. 3 is a rear end view in elevation of the cylinder.

Fig. 4 is a longitudinal view in elevation of the dasher alone.

Fig. 5 is a rear end view in elevation of the dasher.

Fig. 6 is a cross sectional view of the dasher taken on the plane of the line 6—6 in Fig. 4 with an added section of the cylinder wall.

Figs. 7, 8 and 9 respectively are a side view, a top view and a front view of one of the scraper blade supports.

Fig. 10 is an end view of a scraper blade.

Fig. 11 is a partial side view of a scraper blade.

Fig. 12 is a cross sectional view similar to Fig. 6 except that the supporting structure for the scraper blades shown in Fig. 6 has been omitted in Fig. 12 so that the space relation between the dasher body, the scraper blades and the cylinder wall is clearly apparent.

Fig. 13 is a cross sectional view similar to Fig. 12 except for a modification in which the lateral walls of the dasher body are curved inwardly.

Fig. 14 shows a further modification in which the dasher body is triangular in cross section.

In the drawings, the reference numeral 1 indicates a cylindrical wall defining a chamber 2 within which the ice cream mix is processed. An outer cylinder 3 provides an annular space 4 about the cylinder 1 for the circulation of a refrigerant. A front closure ring 5 and a rear closure ring 6 join the cylinders 1 and 3 in sealing closure of the front and rear ends of the annular space 4. A dome 7 is provided on the upper side of the cylinder 3 in sealed communication with the space 4. The dome 7 serves as a supply receiver for ammonia refrigerant, the upper portion of the dome (not shown herein) carrying the conventional connections and controls which are well known and common to ammonia refrigeration apparatus. A conventional oil trap 7a is provided at the bottom of the cylinder 3 in communication with the refrigerant space 4. The outer surfaces of the cylinder 3 and dome 7 are covered with conventional insulation 8.

The front end of the cylinder 1 is secured in a front support housing 9 of which the lower portion 10 is adapted for attachment to the machine frame (not shown). An outlet opening 11 is provided at the bottom of the front end of the cylinder 1, the opening 11 being in register with a tubular discharge passage 12 provided in the housing 9. The passage 12 is adapted for pipe connection with a metering pump (not shown) which controls the rate of discharge of the congealed ice cream from the chamber 2. The rear end of the cylinder 1 is secured in a support ring 13, the lower portion of the ring 13 being supported upon the machine frame (not shown).

The front end of the cylinder 1 is closed by a removable door 14 secured in position by swing bolts 15 mounted upon the housing 9. An inspection tube 16 is provided in the door 14, the tube 16 opening into the chamber 2 and being outwardly adapted for attachment of a sealing cap (not shown).

The rear end of the cylinder 1 is closed by a removable head 17 secured in position by bolts 18 extending into the support ring 13. A mix inlet 19 is provided in the rear head 17, the inlet 19 opening into the chamber 2 and being adapted for pipe connection with a mix supply pump (not shown). An air inlet 20 also is provided in the rear head 17, the air inlet 20 opening into the chamber 2 and being adapted for pipe connection with an air pump (not shown).

Operatively positioned within the chamber 2 is a dasher having a hollow body 21 extending longitudinally of the cylinder 1 with its axis coincident with the axis of the cylinder. The dasher body 21 is constructed with plural lateral surfaces 22, 22a, 22b and 22c. The lateral surfaces are preferably alike and have their adjacent longitudinal edges joined in radially protruding angular corners 23, 23a, 23b and 23c. The corners thus formed project a greater radial distance from the axis of rotation of the dasher body than the radial distance between any intermediate portions of the lateral surfaces and the axis, so that in rotation the corners move in a circular path radially outward of the path of the intermediate lateral surfaces. While the dasher body 21, selected for the present description is illustrated with the lateral surfaces and corners parallel to its axis, it is contemplated that the body 21 may be constructed with the lateral surfaces and corners tapering toward one end in the form of a truncated pyramid. Also, the number and the cross sectional contour of the lateral surfaces may be varied as hereinafter described.

The front end of the dasher body 21 is closed and sealed by an end plate 24 upon which is fixed an axially positioned stub shaft 25. A bearing 26 is provided for the stub shaft 25 in the front door 14. The rear end of the body 21 likewise is closed and sealed by an end plate 27 upon which is fixed an axially positioned stub shaft 28 having its outer end bored and splined as at 29 for endward engagement with a drive shaft shown in part at 30. A bearing 31 is provided in the rear head 17 through which the stub shaft 28 extends. A shaft seal ring 32 is slidably mounted on the stub shaft 28 inwardly of the rear head 17. A compression spring 33 is confined between the end plate 27 and the seal ring 32 which urges the ring 32 into operative sealing contact with a complementary sealing surface provided on the inner face of the rear head 17.

Scraper blades 34 are mounted on the lateral surfaces of the dasher body 21. In the present arrangement, there are two blades positioned in alinement upon each surface. Each of the similar blades 34 is swingably mounted upon a pair of like supporting posts 35. Preferably, each post 35 extends through opposite side walls of the body 21 and is sealed thereto as by welding. The blade supporting end of each post 35 is provided with a lateral pin 36 carrying a locking boss 37. Each blade 34 is formed with a pair of integral pivot ears 38, each ear having an aperture 39 adapted to receive the pin 36 of its supporting post 35 and swingably support the blade 34 in operating position. The aperture 39 is enlarged as at 40 sufficiently to pass over the locking boss 37 in assembling the blade upon the pins, the enlargement 40 passing out of register with the boss 37 when the blade is turned to operating position so that the pivot ears 38 are locked upon the pins 36.

Upon rotation of the dasher in operation, the blades 34 swing outward upon their supports into angular scraping contact with the inner surface of the refrigerated cylinder 1. The outer edge of each blade 34 is sharpened as at 41 for effective scraping of the cylinder surface. The dasher assembly is adapted for easy removal from the chamber 2, for frequent cleaning of the dasher and chamber, by releasing the swing bolts 15, removing the front door 14, and withdrawing the entire dasher assembly through the then open front end of the cylinder 1.

It will be noted that the rearward group of four scraper blades 34 are slightly overlapped longitudinally in the relation of the blades mounted on adjacent lateral surfaces of the dasher body 21, but that the four blades operatively scrape substantially the same rearward area of the cylinder 1 so that there are four scrapings of that area of the cylinder with each revolution of the dasher. The front group of four blades are widely overlapped longitudinally in the relation of the two pairs of oppositely mounted blades with the result that the front end portion of the cylinder 1 receives only two scrapings with each revolution of the dasher. This positioning of the blades 34 is advantageous in operation in that the greater temperature difference, and consequent higher rate of heat exchange, between the relatively warm mix flowing into the rear end of the chamber 2 and the cold wall of the cylinder 1 requires more rapid circulatory movement of the mix to maintain uniform temperature reduction in the mix than is required at the front end of the chamber 2 where the mix is substantially congealed.

It will be noted further that the scraper blades 34 and their supporting posts 35 are so constructed that each blade may be endwardly reversed in position upon its pair of supporting posts so that the opposite side of its sharpened edge 41 is in scraping contact with the wall of the cylinder 1. The identical ears 38 and apertures 39 permit entry of the pivot pins 36 from either sides of the ears. Frequent reversal of the scraper blades equalizes the wear on opposite sides of the scraping edges 41 and preserves sharp cutting edges in contact with the cylinder wall. This provision of reversible scraper blades avoids the necessity for frequent removal and grinding of the blades to restore effective cutting edges, as has been the customary practice, and results in material savings in maintenance costs.

In operation, a continuous flow of ice cream mix is supplied at a regulated rate to the chamber 2 through the mix inlet 19, and the congealed ice cream is withdrawn therefrom at a regulated rate through the discharge passage 11. Air is supplied to the chamber 2 at a predetermined pressure through the air inlet 20. The mix is chilled by the refrigerated wall of the cylinder 1 while the rotating dasher causes a circulatory movement of the mix to and from the cold cylinder wall and incorporates air in the mix to produce the desired over-run in the ice cream.

The dashers heretofore used in continuous and other types of ice cream freezers have been constructed with the scraping blades mounted upon rotatable blade carriers varying in form as, for examples, a closed drum having a substantially cylindrical contour, a cylindrical frame having more or less extensive openings into the interior of the frame, or longitudinal bars extending between supporting end frames. Auxiliary agitators have been provided within the open frame and bar types of blade carriers.

In contrast, the dasher of the present invention has a closed body of angular peripheral contour which eliminates the central portion of the space within the cylinder 1 from the zone of flow of the mix through the cylinder, and confines the flowing mix to the outer flow space between the cylinder and the lateral surfaces of the dasher body, where the protruding angular corners of the body and the scraper blades in operation maintain substantially uniform agitation of all of the mix. The outer flow space is of large cross area providing the capacity for the flow of the mix in the mass proportion necessary to a proper whipping in of the air and frozen crystals scraped from the cylinder wall.

Ice cream mixes vary as to their ingredients in accordance with trade demand in different localities for particular characteristics in ice cream. They vary also as to the character of similar ingredients. Cream varies notably with differences in grain feed and pasture condition for the cows. Mixes vary in their whipping capacity, often because of the different water binding qualities of the ingredients. It has been found that an ice cream freezer may operate successfully with mixes of some formulas and not with mixes of other formulas. Experience indicates that such operating limitations in the freezer have been due to the structural and operating characteristics of the dashers commonly used in ice cream freezers.

Ice cream mix is a peculiarly sensitive substance in its processing, especially in the amount and kind of agitation or whipping which the various types of mix may require or can withstand in producing the desired body and texture of ice cream. Further, there is a relation between the progress of crystallization in the congealing mix and the manner of its movement to and from the refrigerated cylinder wall. An irregular movement with zones of relative inaction in any portion of the volume of mix prevents uniform reduction of temperature, with consequent poor results from the whipping action of the dasher in producing the desired texture of the product. A mix of one formula may withstand such a condition while a mix of another formula breaks down under the irregular changes of temperature and will not produce the desired firmness in the ice cream. Also, too rapid refrigeration of the mix in insufficient mass prevents the kneading effect accomplished by proper agitation in a greater mass, and produces a destabilized product that is not desirable. The present invention overcomes these difficulties in marked degree and has proven highly successful in operation upon a wide range of mixes of different formulas.

Figs. 12, 13 and 14 illustrate in cross sectional outline, the positional arrangement of the dasher body and the scraper blades within the refrigerated cylinder of the ice cream freezer of the present invention. Fig. 12 shows the selected construction set forth in the preceding detailed description with four lateral plane surfaces. In Fig. 13 the dasher body 21a is a modification of the dasher body 21 in respect to the peripheral contour of the lateral surfaces. The dasher body 21a is constructed with lateral surfaces 42, 42a, 42b and 42c having a concave curvature between their longitudinal edges and having their adjacent edges joined in radially projecting longitudinally extending corners 43, 43a, 43b and 43c. It is contemplated also that the lateral surfaces 42, 42a, 42b and 42c may have a slightly convex curvature between their longitudinal edges which form the angular projecting corners. In Fig. 14 the dasher body 21b is a modification of dasher body 21 in respect to the number of the lateral surfaces. The dasher body 21b is constructed with triangular cross section having three lateral surfaces 44, 44a and 44b joined along their adjacent longitudinal edges in radially projecting corners 45, 45a and 45b. It is contemplated also that the dasher body 21 may be further modified by having more than four lateral surfaces joined along their adjacent longitudinal edges in radially projecting corners. The operating characteristics of the several modifications of the dasher body 21 are similar to the characteristics described herein for the selected arrangement shown in Fig. 12.

Referring to Fig. 12, the dasher body 21 is illustrated in square cross section and the blades 34 are shown in operating position in scraping contact with the cylinder 1. The imperforate lateral surfaces 22, 22a, 22b and 22c of the dasher body 21 and the opposed portions of the cylinder 1 define a circumferential series of subchambers 46, 46a, 46b and 46c for the flowing mix. The subchambers are interconnected by restricted passages 47, 47a, 47b and 47c formed between the cylinder wall 1 and the radially projecting corners 23, 23a, 23b and 23c of the dasher body 21. A scraper blade 34 is positioned in each subchamber. The corresponding subchambers shown in Fig. 13 are indicated at 48, 48a, 48b and 48c, and the corresponding restricted passages are indicated at 49, 49a, 49b and 49c. The corresponding subchambers shown in Fig. 14 are indicated at 50, 50a and 50b, and the corresponding restricted passages are indicated at 51, 51a and 51b. The subchambers are of wide and deep proportions designed to carry the flowing mix in sufficient mass for effective intermixing. The closed dasher body occupies the central portion of the space within the cylinder 1 and eliminates from the processing space any quiescent central zones or pockets wherein the mix could rest without direct agitation. The radially distant position of the subchambers from the axis of rotation of the dasher body results in uniform high velocity agitation of all of the mix.

The operating effect of the rotating dasher body and scraper blades upon the flowing mix contained in the several subchambers is similar in each subchamber. The following description of the action occurring in one of the subchambers applies equally to the other subchambers shown in Figs. 12, 13 and 14. Referring to Fig. 12, the dasher body 21 and the scraper blades 34 rotate in the direction indicated by the arrows. In operation, the mix and incorporated air contained in the trailing portion of the subchamber 46a is compressed against the refrigerated cylinder 1 by the advancing portion of the lateral surface 22a adjacent to the projecting corner 23. Extreme turbulence is created in that area as the advancing corner 23 sweeps through and over the mass of mix, with maximum compression occurring in the restricted passage 47 between the corner 23 and the cylinder 1. Immediately after the passing of the corner 23, the cells of air incorporated in the mix are relieved of compression and sharply expand the volume of the stream of mix entering the subchamber 46. This expansion of the air cells coupled with the rolling turbulence of the mix in the wake of the passing corner 23 effects a thorough intermixture of the mass and uniform subdivision and dispersion of the enrobed air cells.

Concurrently with the above action in the inner mass of mix, a thin layer of that portion of the mix compressed against the cold surface of the cylinder 1 has been crystallized. The advancing scraper blade 34, which is following the corner 23, cleanly scrapes the congealed layer of mix from the cylinder surface and passes it into the turbulent inner mass of mix now sweeping the inwardly inclined face of the blade 34, where it is thoroughly intermixed. The inclined inner surface of the blade 34 and the adjacent lateral surface 22 of the dasher body are in converging relation so that the mass of mix passing between them is again compressed. As the mix passes over the inner edge of the blade 34 into the area of maximum volume of the subchamber 46, the expanding air cells and a partial vacuum existing behind the blade 34 cause a swirling movement of the mix about the edge of the blade which forces the mix again into contact with the refrigerated cylinder wall immediately behind the blade. The approaching portion of the lateral surface 22 adjacent to the trailing corner 23c then comes into play to effect compression of the mix into the restricted passage 47c formed by the corner 23c and the adjacent wall of the cylinder 1, with the beginning in subchamber 46c of another cycle of the action described.

The above described action by the broad smooth surfaces and the protruding corners of the dasher body, supplemented by the scraper blades, causes a succession of compression and expansion periods coupled with a pulsating turbulence affecting the whole volume of mix flowing through the chamber 2. The agitation produced in the mix is in the nature of a very rapid rolling and kneading action which is highly efficient in effecting the uniform intermixture of the congealing mix and the incorporation of the air with uniform distribution. Such agitation is especially advantageous in the finishing stage of congelation when the mix has become stiffly viscous. Thorough whipping of the largely congealed mass is important at that stage to develop the firm body and smooth texture desired in the ice cream. The positive broadside sweep of the wide corner surfaces through the stiffened mass accomplishes that end with superior results. There is not any violent tearing agitation of some portions of the mix while other portions are relatively quiescent, such violent action breaking down portions of the natural structure of the mix ingredients and making the finished ice cream unstable in body and texture. The circulatory movement of the mix accomplished by the present invention constantly involves the entire mass of mix with consequent equal effect upon all portions. Also, the uniformly progressive temperature reduction in the mix enables precise control of the temperature of the finished product with a material reduction in the required refrigeration applied to the freezing cylinder.

I claim as my invention:

In apparatus for freezing ice cream and other fluent materials and having a freezing cylinder, a dasher body rotatably mounted within said cylinder, the periphery of said dasher body consisting of a plurality of lateral surfaces joined along their longitudinal edges in angular corners which project a greater radial distance from the axis of rotation of said dasher body than any intermediate portions of said lateral surfaces, said lateral surfaces in conjunction with said cylinder forming a circumferential series of subchambers serially connected by passages between said corners and said cylinder, and longitudinally extending scraper blades mounted on said dasher body and positioned within said subchambers, said blades having scraping contact with said cylinder when said dasher body is in rotation.

ALDEN H. WAKEMAN.

REFERENCES CITED

The following references are of record in the file of this patent:

UNITED STATES PATENTS

| Number | Name | Date |
|---|---|---|
| 523,781 | Wallace | July 31, 1894 |
| 1,241,390 | Jackson | Sept. 25, 1917 |
| 2,191,344 | Erickson | Feb. 20, 1940 |
| 2,211,387 | Routh | Aug. 13, 1940 |
| 2,282,298 | Vogel | May 5, 1942 |
| 2,316,845 | Craft | Apr. 20, 1943 |